US008506249B2

(12) United States Patent
Egedal

(10) Patent No.: US 8,506,249 B2
(45) Date of Patent: Aug. 13, 2013

(54) METHOD OF REDUCING A STRUCTURAL UNBALANCE IN A WIND TURBINE ROTOR AND DEVICE FOR PERFORMING THE METHOD

(75) Inventor: Per Egedal, Herning (DK)

(73) Assignee: Siemens Aktiengesellschaft, München (DE)

( * ) Notice: Subject to any disclaimer, the term of this patent is extended or adjusted under 35 U.S.C. 154(b) by 1516 days.

(21) Appl. No.: 12/080,459

(22) Filed: Apr. 3, 2008

(65) Prior Publication Data

US 2008/0247873 A1 Oct. 9, 2008

(30) Foreign Application Priority Data

Apr. 4, 2007 (EP) ...................................... 07007127

(51) Int. Cl.
*F01D 7/00* (2006.01)
*F03D 7/04* (2006.01)

(52) U.S. Cl.
USPC ............................................................. 416/61

(58) Field of Classification Search
USPC .................... 290/44, 55; 416/27, 37, 38, 61, 416/147, 155
See application file for complete search history.

(56) References Cited

U.S. PATENT DOCUMENTS

| | | | |
|---|---|---|---|
| 6,208,944 B1 * | 3/2001 | Franke et al. .................... | 702/56 |
| 6,619,918 B1 * | 9/2003 | Rebsdorf .......................... | 416/1 |
| 7,004,724 B2 * | 2/2006 | Pierce et al. ..................... | 416/61 |
| 7,160,083 B2 * | 1/2007 | Pierce et al. ..................... | 416/61 |
| 7,351,033 B2 * | 4/2008 | McNerney ......................... | 416/1 |

FOREIGN PATENT DOCUMENTS

| | | |
|---|---|---|
| EP | 1544458 A2 | 6/2005 |
| EP | 1666723 A1 | 6/2006 |
| EP | 1719910 A1 | 11/2006 |
| WO | WO 2007012487 A1 | 2/2007 |
| WO | WO 2007104306 A1 | 9/2007 |

OTHER PUBLICATIONS

Caselitz et al., "Rotor Condition Monitoring for Improved Operational Safety of Offshore Wind Energy Converters", Journal of Solar Energy Engineering, May 2005, pp. 253-261., vol. 127.
Caselitz et al, "Reduction of Fatigue loads on wind energy converters by advanced control methods", European Wind Energy Conference, Oct. 1997, Dublin Castle, Ireland, pp. 555-558, XP 8031751.
Bossanyi, "Individual blade pitch control for load reduction", Wind Energy, 2003, pp. 119-128, vol. 6, Published online Oct. 8, 2002, XP008031928.

* cited by examiner

*Primary Examiner* — Nathaniel Wiehe
*Assistant Examiner* — Sean J Younger

(57) ABSTRACT

Disclosed is a method of reducing a structural unbalance in a wind turbine rotor with pitch control and a control device for performing the method are provided. The method comprises the steps of: detecting a magnitude of the structural unbalance and its phase in relation the rotor's azimuth ($\theta$) on the basis of a measurement of the rotor's azimuth ($\theta$) and a measurement of the rotor speed or the generator speed ($\omega$), establishing individual pitch angle offsets for each blade of the rotor on the basis of the magnitude and the phase, and adding the individual pitch angle offsets to the respective pitch angles of the blades of the rotor.

3 Claims, 4 Drawing Sheets

METHOD OF REDUCING A STRUCTURAL UNBALANCE IN A WIND TURBINE ROTOR AND DEVICE FOR PERFORMING THE METHOD

CROSS REFERENCE TO RELATED APPLICATIONS

This application claims the benefits of European application No. 07007127.9 filed Apr. 4, 2007, an is incorporated by reference herein in its entirety.

FIELD OF INVENTION

The present invention relates to a method of reducing a structural unbalance in a wind turbine rotor with pitch control and to a control device for controlling the pitch angles of the rotor blades of a wind turbine rotor.

BACKGROUND OF THE INVENTION

Wind turbine rotors may turn out to be unbalanced at the installation of the wind turbine. The unbalance may be caused by differences in blade weight, more precisely by blade root bending moment caused by gravity, by differences in adjustment of the blade pitch setting on the pitch mechanism of the rotor hub, or by aerodynamic differences from one blade to the other. Unbalances due to the blade root bending moment can arise i.e. from water penetrating the blade thus increasing its mass, or from loose parts inside the blade which move, e.g. outwards during rotor revolution. Aerodynamic differences between blades may be caused, e.g., if the angles of attack differ from one blade to another.

While unbalances resulting from differences in the blade root bending moment or in the adjustment of the blade pitch setting manifest themselves in a periodic transverse oscillation relative to the rotor axis with the same frequency as the rotation of the rotor (the so-called 1p frequency), aerodynamic unbalances manifest themselves in a periodic force having a frequency which corresponds to three times the rotor frequency for a usual three bladed rotor blade. This frequency is called 3p-frequency. When operating with an unbalanced rotor, a wind turbine will experience higher structural loads compared to a wind turbine operating with a balanced rotor, which reduces the lifetime of the rotor.

In order to reduce the load acting on wind turbine rotor blades, EP 1 666 723 A1 describes a blade pitch angle control device which calculates individual blade pitch angles for different blades on the basis of the measured wind speed, the air density, the rotor's azimuth angle and the wind turbine's power generator output. The individual blade pitch angle control signals are added to a common pitch angle signal so as to build up the control signal delivered to the blade's pitch mechanisms. In an alternative embodiment individual load measuring units are provided for each rotor blade instead of wind speed detecting units, air density detecting units and wind power generator output detecting units. In any case, a number of detecting units need to be provided for gathering the necessary information for the control unit to calculate the individual blade pitch angle control signals.

EP 1 544 458 A2 describes a pitch angle control for a wind turbine rotor. The pitch angle is set on the basis of the detected load on a part of the wind turbine unit. The loads may be detected on the basis of the measured wind speed or by a direct measurement of the mechanical load acting on a part of the rotor, in particular on the rotor blades.

A method of monitoring the conditions of rotor blades is described in P. Caselitz and J. Giebhardt "Rotor condition monitoring for improved operational safety of offshore wind energy converters", Journal of Solar Energy Engineering, May 2005, Vol. 127, Issue 2, Pages 253 to 261. The condition of the rotor is determined on the basis of calculating and monitoring the 1p-oscillations of the nacelle. Based on the power output and the amplitude of the 1p-oscillation the condition of the rotor is classified as "okay" or "fault".

SUMMARY OF INVENTION

It is a first objective of the present invention to provide an advantageous method of reducing an unbalance in a wind turbine rotor with pitch control. It is a second objective of the present invention to provide an advantageous control device for providing pitch angle offsets for blades of a wind turbine rotor.

The first objective is solved by a method of reducing a structural unbalance in a wind turbine rotor. The second objective is solved by a control device. The depending claims define further developments of the invention.

The inventive method of reducing a structural unbalance in a wind turbine rotor with pitch control comprises the following steps:

Detecting a magnitude of the structural unbalance and its phase in relation to the rotor's azimuth on the basis of a measurement of the rotor's azimuth and a measurement of the rotor speed or the generator speed;

Establishing individual pitch angle offsets for each blade of the rotor on the basis of the magnitude and the phase; and Adding the individual pitch angle offsets to the respective pitch angles of the blades of the rotor.

By basing the calculation of the individual pitch angle offsets on the rotor's azimuth and speed, it becomes possible to introduce a simple feedback control mechanism as the rotor speed and the generator speed as a function of the rotor's azimuth is directly influenced by the pitch angle offsets. Therefore, the inventive method provides the possibility of regulating the pitch angle offsets such that the rotor speed and the generator speed, which is directly coupled with the rotor speed, becomes uniform with respect to the rotor's azimuth. In contrast thereto, a closed loop feedback control is not provided in the state of the art as external parameters such as, e.g., wind speed or air density, are not influenced by the pitch angle offset. Therefore, closed loop control is not possible with state of the art control mechanisms.

A further advantage of the present method is that the number of measuring units can be reduced as the measuring of external parameters, such as wind speed or air density, is not necessary. Rotor speed and the rotor's azimuth, however, are usually measured anyway in a wind turbine so that the information the inventive method is based on is already present in the wind turbine's control system. Therefore, implementing the inventive method does not require adding additional measuring units to the rotor.

The magnitude of the unbalance and its phase may be derived by determining the magnitude of the rotor's 1p-oscillation component and its phase in relation to the rotor's azimuth from the measured azimuth and the measured rotor speed or the measured generator speed. This development of the invention is, in particular, suitable for reducing unbalances which result from mass unbalances or by unbalances in the 0° calibration of the individual rotor blades. Determining the 1p-oscillation component can be done by usual algorithms such as fast Fourier transformation or by the so-called Goertzel algorithm.

When the magnitude of the unbalance and its phase is derived from the rotor's 1p-oscillation component, the 1p-oscillation component may be represented by a complex number, e.g., by an absolute value and an argument in the polar representation of complex numbers. This complex number may, in particular, be a mean value of at least two complex numbers each representing the 1p-oscillation component. By this measure the detection of the 1p-oscillation component can be improved if there is a high degree of noise in the detected rotor speed.

A phase correction factor can be determined from the argument of the complex number representing the 1p-oscillation component and the complex number representing the 1p-oscillation component may be corrected by multiplying it with a complex correction factor. This advantageous development provides the possibility of removing unwanted phase impacts resulting from closed loop responses of the pitch and power controller. Such phase impacts can be seen in the 1p-oscillation component as a variation of the 1p-oscillation component's argument with time as the argument resulting from the actual unbalance usually does not have a time dependency. The described development of the inventive method provides the possibility of cancelling the artificial time dependency of the 1p component's argument by the use of the complex correction factor.

The complex correction factor can be determined from the 1p component's argument by differentiating the argument and integrating the differentiated argument again. The again integrated argument is then used as an argument of a complex number with a unity absolute value to form the complex correction factor. By differentiating the argument with respect to time, the constant contribution to the argument which results from the actual unbalance becomes zero so that only the time dependent phase impacts from closed loop responses remain in the differentiated argument. By integrating the differentiated argument again over a certain period of time, in particular the sampling period, a constant factor is derived which does not contain the contribution from the actual unbalance but only the contributions of the unwanted phase impacts. The complex number which is derived from the reintegrated argument can therefore be used as a phase correction term to the 1p-oscillation component.

An inventive control device for providing pitch angle offsets for each blade of a wind turbine rotor so as to reduce an unbalance in the rotor comprises a rotor speed detector, a rotor azimuth detector, an oscillation detecting unit and a calculation unit. The rotor speed detector is designed to output a rotor speed signal representing the detected rotor speed. The detected rotor speed can be detected either directly by measuring the rotor speed or indirectly by measuring the generator speed. The rotor azimuth detector is designed to output a rotor azimuth signal representing the detected azimuth. The rotor speed detector and the rotor azimuth detector are connected to the oscillation detecting unit. This unit is designed to receive the rotor speed signal and the rotor azimuth signal and to detect a frequency component resulting from an unbalance in the wind turbine rotor on the basis of the received rotor speed signal and the received rotor azimuth signal. It is further designed to output a frequency component signal representing the frequency component detected in the oscillation detecting unit. The calculation unit, which is connected to the oscillation detection unit for receiving the frequency component signal, is designed to calculate individual pitch angle offsets for each blade of a wind turbine rotor on the basis of the frequency component signal such that the frequency component detected in the oscillation detecting unit is reduced, preferably below the detection limit.

The inventive control device is adapted for performing the inventive method in a closed loop feedback control. As reducing the unbalance reduces the frequency component derived from the measurements of the rotor speed and the rotor azimuth, a closed loop is built up which allows for the inventive method to be performed as a feedback control. No adjustment needs to be performed after the 1p-oscillation component has been reduced below the detection limit by the individual pitch angle offsets as long as the conditions remain the same. The pitch angle offset only has to be readjusted if changes in the structural unbalance occur, e.g. by water penetrating a blade.

The calculation unit of the control device may comprise a correction factor calculator unit which is connected to the oscillation detecting unit for receiving the frequency component signal. This calculator is designed to calculate and to output a complex phase correction factor on the basis of the frequency component signal. The control device then further comprises a multiplier which is connected to the oscillation detecting unit for receiving the frequency component signal and to the correction factor calculator unit for receiving the complex phase correction factor and which is designed to multiply the frequency component signal by the complex phase correction factor. As has already been described with respect to the inventive method, phase impacts from closed loop responses can be eliminated by the complex phase correction factor.

The correction factor calculator unit may, in particular, comprise an argument determination unit which is connected to the oscillation detecting unit for receiving the frequency component signal and which is designed to determine the argument of the (complex) frequency component signal and to output the argument. A differentiator is then connected to the argument determination unit for receiving the argument and is designed to determine and to output the time derivative of the argument. An integrator is connected to the differentiator for receiving the time derivative of the argument. The integrator is designed to integrate the time derivative of the argument and to output the integration value. The correction factor calculation unit further comprises a complex factor building unit which is connected to the integrator for receiving the integration value. It is designed to form the complex phase correction factor by a multiplication of the integration value by the complex unit and a subsequent exponentiation and to output the complex phase correction factor. By this, a complex number is constructed which has, in the polar representation, unity absolute value and the integrated time derivative as its argument. Such a correction factor contains only contributions from (time dependent) closed loop responses as has already been explained with respect to the inventive method.

In the inventive control device the oscillation detecting unit may comprise an averaging unit which is designed to derive the frequency component signal by averaging at least two signals each representing the frequency component. This device is, in particular, useful if the unbalance is small so that the 1p-oscillation component fluctuates considerably. By the averaging, the detection limit for detecting an unbalance can be improved. Averaging may, e.g., be performed by calculating the mean value of the number of signals. However, more sophisticated averaging techniques can also be used, e.g., techniques employing weights.

BRIEF DESCRIPTION OF THE DRAWINGS

Further features, properties and advantages of the present invention will become clear from the following description of an embodiment of the invention in conjunction with the accompanying drawings.

DETAILED DESCRIPTION OF INVENTION

The inventive control device and the inventive control method will now be described with reference to the figures.

Figure 1:
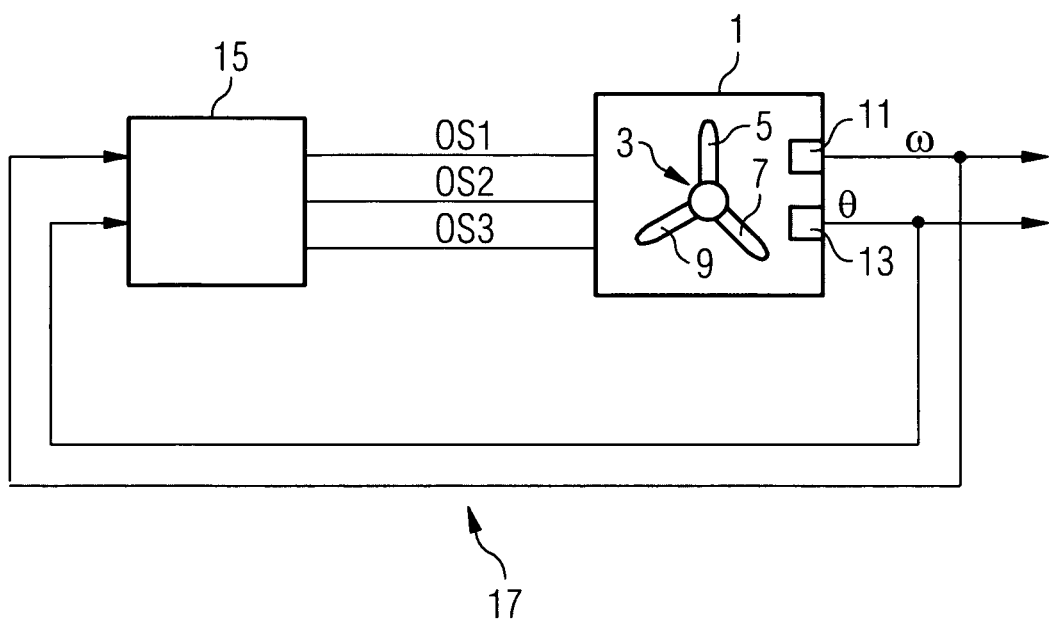
FIG. 1 shows, in the form of a block diagram, a wind turbine with an inventive control device.

FIG. 1 shows a wind turbine 1 which comprises a rotor 3 with three rotor blades 5, 7, 9 with pitch angle control and a control device 15 which is connected to the wind turbine 4 for sending individual offset adjustment signals OS1, OS2, OS3 to actuators setting the pitch angles of the blades. These signals are used for adjusting offsets in the individual blade's pitch angles. The adjustment is performed automatically within a predefined range while the turbine is running. No user intervention should therefore be necessary unless adequate compensation is not possible within the allowed working range of the control algorithm.

A rotor speed detector 11 for detecting the rotor speed ω and an azimuth detector 13 for detecting the rotor's azimuth θ are present in the wind turbine 1. The rotor speed detector 11 may either be located at the low speed or the high speed side of a gearbox connecting the rotor shaft to the rotor of the generator. Depending on the location of the rotor speed detector, the gear ratio may have to be taken into account.

The rotor speed detector element outputs a signal ω representing the rotor speed of the rotor 3 and the azimuth detector outputs an azimuth signal θ representing the azimuth of the rotor 3. Both signals are used for several control actions in the wind turbine. In addition, the rotor speed signal ω and the azimuth signal θ are fed to the control device 15 via a feedback loop 17.

In the control device 15 a 1p-oscillation component, i.e. its magnitude and phase, is calculated from the rotor speed and synchronised with the rotor's azimuth. The 1p-oscillation component which represents a structural unbalance of the rotor, is represented by a complex number, in particular by an absolute value and an argument of the complex number in polar representation. The offset signals OS1, OS2, OS3 are then derived from the complex number representing the 1p-oscillation component. How the control device 15 derives the offset signals OS1, OS2, OS3 from the 1p-oscillation component will now be described with respect to FIG. 2.

Figure 2:
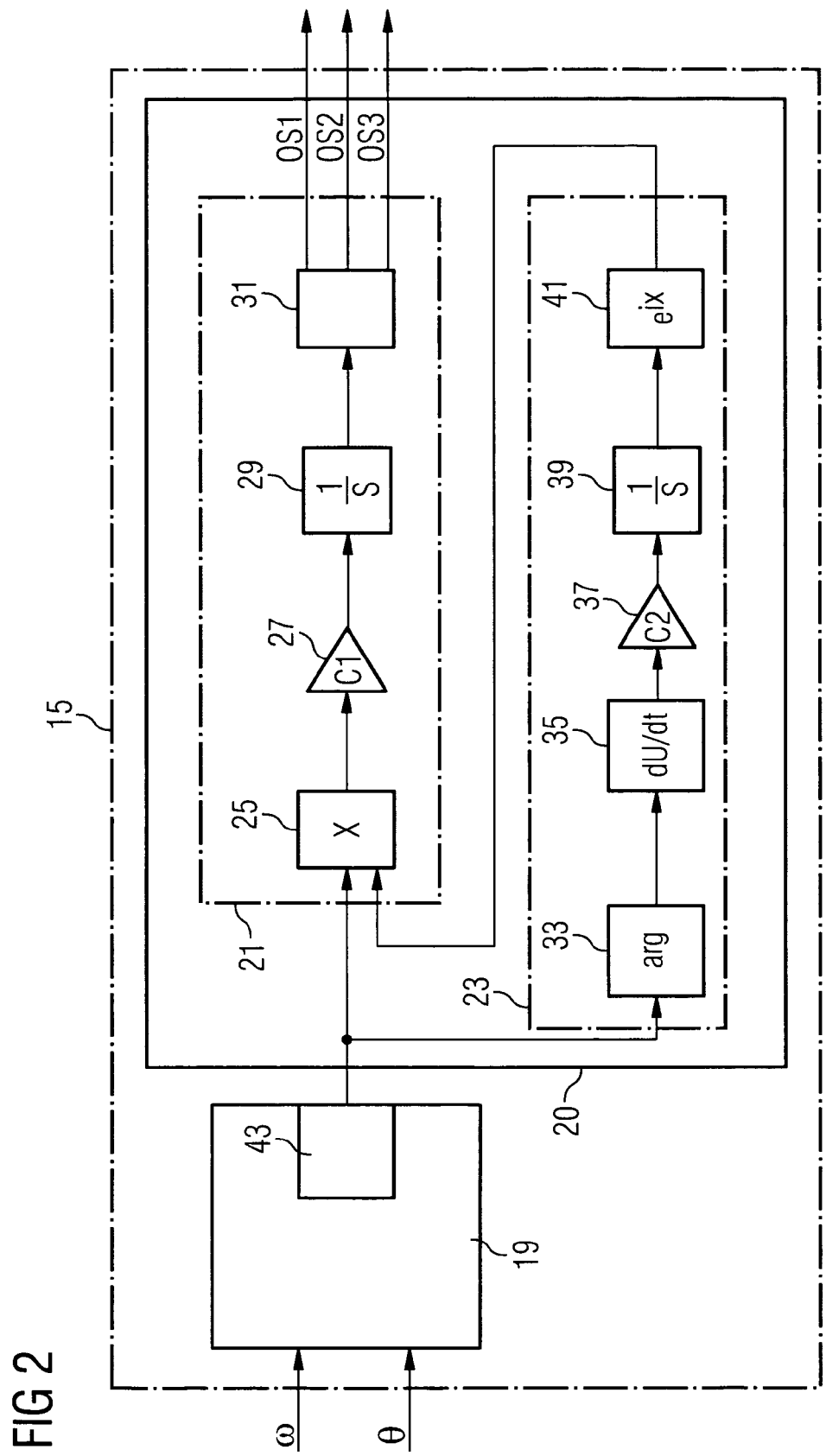
FIG. 2 shows the control device in a detailed block diagram.

FIG. 2 shows the control device 15 in more detail. The control device 15 comprises an oscillation detection unit, in the present embodiment a 1p detector, which is connected via the feedback loop 17 to the rotor speed detector 11 for receiving the rotor speed signal ω and to the azimuth detector 13 for receiving the azimuth signal θ. The oscillation detecting unit 19 is, in the present embodiment, designed to calculate the 1p-oscillation component of the rotor on the basis of rotor speed signal and the azimuth signal by use of a Goertzel algorithm. The oscillation detecting unit 19 will therefore be referred to as Goertzel detector 19 in the following. The Goertzel algorithm is a digital signal processing technique which allows calculating discreet frequency components of a signal to be identified, in the present case of the rotor speed signal. It is a special form of discreet Fourier transformation. In contrast to other forms of the discreet Fourier transformation which calculate all discreet oscillation components, the Goertzel algorithm offers the advantage of allowing only a single oscillation component to be calculated. This reduces computation time in cases where only one oscillation component of a signal is of interest, as in the present case, the 1p component. However, other Fourier transformation methods, such as Fast Fourier Transformation, could be used instead of the Goertzel algorithm.

The output of the Goertzel detector 19 is the complex number already mentioned. The absolute value of the complex number gives the amplitude of the 1p-oscillation component while the phase with respect to the rotor's azimuth can be derived from the relation of the complex number's real part to its imaginary part. If the complex number is represented in polar coordinates e.g. in the form $$Z = Re^{i\phi}$$

then the argument $\phi$ of the exponential function represents the phase of the 1p-oscillation component with respect to the rotor's azimuth and R its absolute value.

The control device 15 further comprises a calculation unit 20 which is subdivided into a main calculation unit 21 and a correction factor calculator 23. The calculation unit 20 is connected to the Goertzel detector 19 for receiving a complex number which represents the 1p-oscillation component. It is further connected to the wind turbine for delivering the offset signals OS1, OS2, OS3 to the adjustment mechanisms of the individual blades for adjusting their pitch offsets. The offset signals are calculated on the basis of the output of the Goertzel detector 19.

The offset signals OS1, OS2, OS3 are calculated in the main calculation unit 21. This unit comprises a multiplier 25 which is connected to the Goertzel detector 19 for receiving the complex number representing the 1p-oscillation component. The multiplier 25 is further connected to the correction factor calculator 23 for receiving the correction factor which is to be multiplied with the complex number received from the Goertzel detector 19.

An amplifier 27 is connected to the multiplier 25 for receiving the result of the multiplication and for amplifying the result.

The main calculation unit 21 further comprises an integrator 29 which is connected to the amplifier 27 for receiving the amplified result of the multiplication. In the integrator 29 the received amplified result is added to the sum of the preceding amplified multiplication results in order to calculate the integral.

The integrator 29 is further connected to a decoder 31 which receives the integral from the integrator 29 and decodes it so as to establish individual blade offsets for the blades 5, 7, 9 of the rotor 3. It outputs the offset signals OS1, OS2, OS3 which represent the individual blade offsets to the actuators which set the blade's pitch angles.

As the calculation of the individual blade offsets OS1, OS2, OS3 in the main calculation unit 21 is based on an integrator 29, the adjustment of the pitch offsets comes to a halt if the integral reaches a steady state. However, the control action introduces a phase impact which needs to be removed. The aim of adjusting the pitch angle offsets of the blades is to produce a "counter unbalance" that cancels the original unbalance. The counter unbalance fully cancels the original unbalance when the integral has reached a steady state (this means that the sum of the original unbalance and the counter unbalance is below the detection limit of the control device 15). However, before this steady state is reached, a residual unbalance is present which results from the vector sum of the vectors representing the original unbalance and the counter unbalance in the complex plane as the control action is not instantaneous. The residual unbalance will then be detected by the Goertzel detector 19 from the rotor speed. However, the residual unbalance will usually not be oriented parallel to the original unbalance. This means that the complex number output by the Goertzel detector 19 (which can be seen as a vector in the complex plane) has a time dependent argument. This time dependency represents a rotation of the residual unbalance in the complex plane. In the control method, this could lead to a continuous control action although the amplitude of the complex number would be small enough- to come to a halt with adjusting the pitch angle offsets.

In order to remove this rotation of the residual vector in the complex plane, a correction factor calculator calculates a correction factor which counteracts this rotation. The correction factor calculator 23 is connected to the Goertzel detector 19 for receiving the complex number representing the residual unbalance and to the multiplier 25 of the main calculation unit 21 to deliver a complex correction factor. It comprises an argument determination unit 33, a differentiator 35, an amplifier 37, an integrator 39 and a complex factor building unit 41. The argument determination unit 33 is connected to the Goertzel detector 19 for receiving the complex number and determines the complex number's argument, i.e. its phase angle in the complex plane. The argument determination unit 33 is connected to the differentiator 35 which receives the argument and calculates a time derivative of the argument. By forming the time derivative all constant elements in the argument drop out as their time derivative is zero. Therefore, the derivative only represents the time dependent parts of the argument. The time derivative is output to the amplifier 37 where it is amplified and output to the integrator 39 which is connected to the amplifier 37 and to the complex factor building unit 41. The integrator 39 integrates the time derivative. The result of the integration represents a special phase angle. This special phase angle is received from the complex factor building unit 41 which builds a complex number with an amplitude of 1 and the integration result, i.e. the special phase angle, as an argument. This complex number is the correction factor which is output to the multiplier 25.

With the correction factor calculation unit 23, the circular movement of the residual unbalance is detected by calculating the derivative of the residual unbalance's angle in the complex plane. Integrating this derivative gives an angle offset feedback which is fed to the main calculation unit 21. In the main calculation unit 21 the phase of the complex number representing the residual unbalance is changed by the complex correction factor. This reduces the circular movements of the residual balance while its amplitude is reduced to zero by the control process. By forming the derivative of the argument and reintegrating the derivative, one can assure that constant terms of the argument do not enter the correction factor so that the correction factor represents a correction for the time dependent terms in the argument which can result from a closed loop responses of the pitch and power controller.

As the control device of the present embodiment is a digital control device, the derivative is actually the difference between the actual argument and the preceding argument and the integral is just the sum of the actual arguments plus the sum of the preceding arguments.

As there can be a high degree of noise in the rotor speed signal if the unbalance is small, the Goertzel detector 19 in the present embodiment comprises an averaging unit 43. This averaging unit 43 is pre-connected to the output of the Goertzel detector 19 and forms the mean value of complex numbers subsequently put out by the Goertzel algorithm. If the mean value exceeds a predefined threshold the mean value will be output as the complex number representing the 1p-oscillation component. If the threshold is not reached, the mean value is output as soon as the mean value is based on a maximum number of complex numbers, e.g. 256. The use of the averaging unit 43 offers the possibility of deriving the complex number representing the actual 1p-oscillation component to a higher degree of reliability. However, if the noise in the rotation speed signal is small enough with respect to the 1p-oscillation component the averaging unit 43 is not necessary. This would speed up the control method.

How the adaptive blade offset adjustment eliminates the 1p-oscillation component of the rotor is shown in the diagrams of FIGS. 3 to 6.

Figure 3:
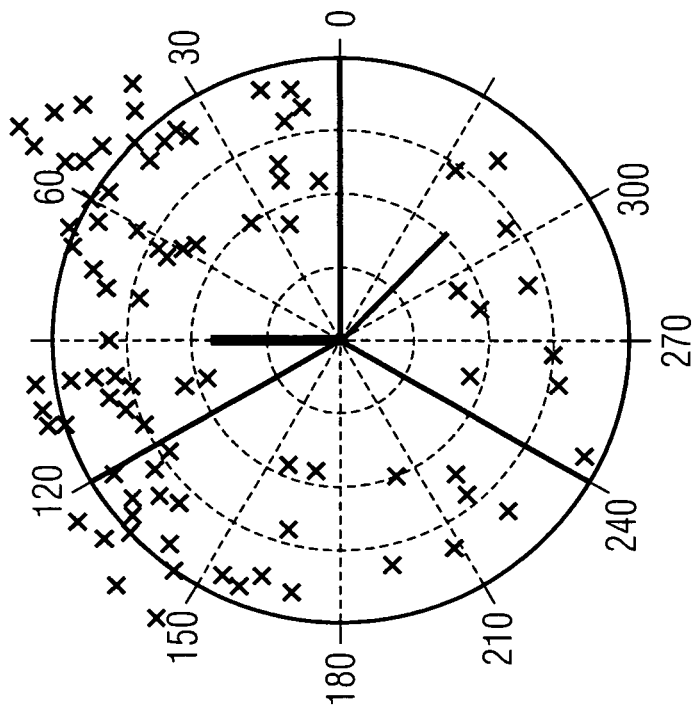
FIGS. 3 to 6 show a sequence of diagrams representing different stages of the control method.

FIG. 3 shows a rotor which is represented by three lines connecting the centre of the diagram to the 0° angle, the 120° angle and the 240° angle. The bold line close to the rotor blade at the 120° angle represents the complex number for the 1p-oscillation component in the complex plane, i.e. the original unbalance. The angle of the bold line with respect to the blade at the 0° angle represents the phase of the 1p-oscillation component with respect to the rotor's azimuth. The length of the bold line represents the amplitude of the 1p-oscillation component. The bold line is a mean value of a plurality of complex numbers output by the Goertzel algorithm. These complex numbers are indicated by crosses in the diagram where the distance of a cross from the centre of the diagram represents the absolute value of the respective complex number and the angle between an imaginary connecting line connecting a cross to the centre and the blade of the 0° angle represents the phase of the respective complex number. It can easily be seen that more complex numbers are used for forming the mean value for smaller amplitudes of the unbalance.

Figure 4:
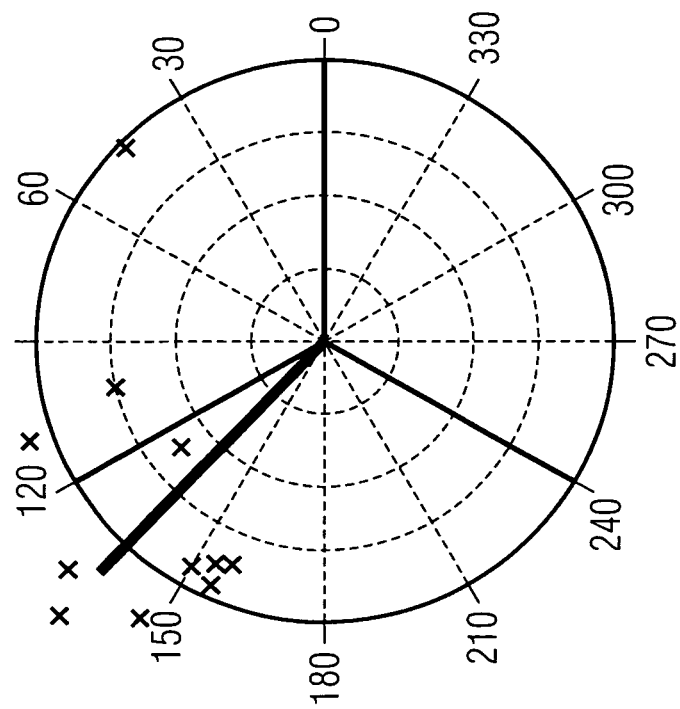
Figure 5:
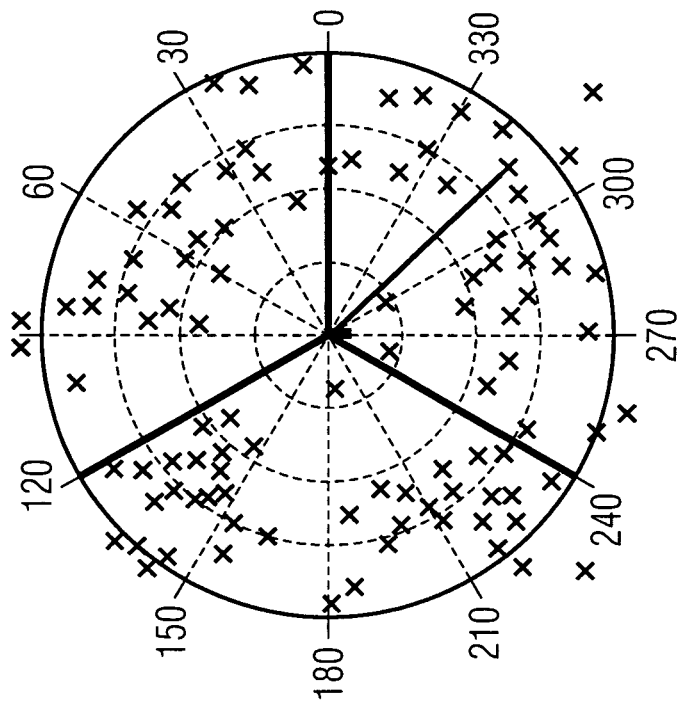
Figure 6:
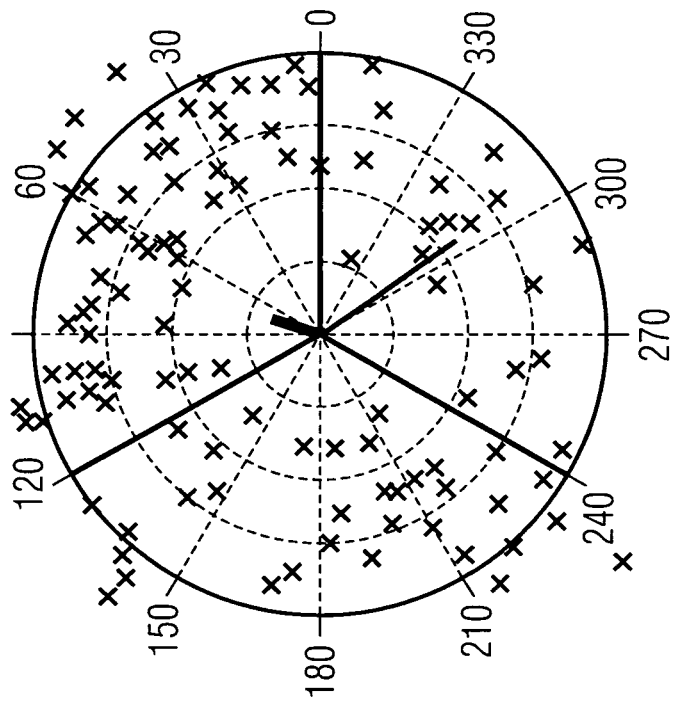

The thin line shown in FIGS. 4, 5 and 6 represents the counter unbalance introduced by the pitch angle offsets of the individual turbine blades during the pitch angle offset adjustment process.

FIG. 3 shows the situation at the beginning of the adjustment. The original unbalance is strong, i.e. the absolute value of the 1p-oscillation component is large. Consequently, only averaging over a few complex numbers is necessary for deriving a suitable mean value. This situation is shown in FIG. 3. The control device then calculates the counter unbalance which is introduced to the rotor by the pitch angle offsets. This counter unbalance is shown in FIG. 4 as a thin line lying in the sector between 300° and 330°. As can also be seen in FIG. 4, the residual unbalance (the now shorter thick line) is not only reduced in amplitude, but also changed in its angle with respect to the 0° line as compared to the original unbalance. If this movement is not taken into account by the complex correction factor, the next counter unbalance which is calculated would show towards the 270°. However, due to the complex correction factor, the angle of the counter unbalance with respect to the 0° line stays almost constant, as can be seen in FIG. 5. Only the length of the counter unbalance increases which means that its amplitude becomes larger. At the same time the absolute value of the residual unbalance becomes smaller.

The final state of the adjustment is shown in FIG. 6. With the counter unbalance shown in FIG. 6, the original unbalance of FIG. 3 is below the detection limit. Due to the correction factor there is no movement of the counter unbalance around the origin of the complex plane. This means that the blade offsets have reached a steady state which does not have to be changed unless the original unbalance changes.

The invention claimed is:

1. A control device for proving pitch angle offsets for each blade of a wind turbine rotor so as to reduce a structural unbalance in the rotor, comprising:
   a rotor speed detector designed to output a rotor speed signal representing the detected rotor speed;

a rotor azimuth detector which is designed to output a rotor azimuth signal representing the detected rotor azimuth;

an oscillation detecting unit connected to the rotor speed detector and the rotor azimuth detector for receiving the rotor speed signal and the rotor azimuth signal, respectively, which is designed to detect a frequency component resulting from a structural unbalance in the wind turbine rotor on the basis of the rotor speed signal and the rotor azimuth signal, and which is designed to output a frequency component signal representing the frequency component detected in the oscillation detecting unit; and a calculation unit connected to the oscillation detecting unit that receives the frequency component signal and designed to calculate individual pitch angle offsets for each blade of the wind turbine rotor on the basis of the frequency component signal such that the frequency component detected in the oscillation detecting unit is reduced, wherein the calculation unit comprises:
- a correction factor calculator unit connected to the oscillation detecting unit for receiving the frequency component signal and designed to calculate and to output a complex correction factor on the basis of the frequency component signal, and
- a multiplier which is connected to the oscillation detecting unit for receiving the frequency component signal and to the correction factor calculator unit for receiving the complex correction factor and designed to multiply the frequency component signal by the complex correction factor.

2. The control device as claimed in claim 1, wherein the correction factor calculator unit comprises:
- an argument determination unit connected to the oscillation detecting unit to receive the frequency component signal and designed to determine the argument of the frequency component signal and to output the argument,
- a differentiator connected to the argument determination unit for receiving the argument and designed to determine the time derivative of the argument and to output the time derivative; and
- an integrator connected to the differentiator for receiving the time derivative of the argument and designed to integrate the time derivative of the argument and to output the integration value; and
- a complex factor building unit connected to the integrator for receiving the integration value and designed to form the complex correction factor by a multiplication of the integration value by the complex unit and a subsequent exponentiation.

3. The control device as claimed in claim 1, wherein the oscillation detecting unit comprises an averaging unit designed to derive the frequency component signal by averaging at least two signals each representing the frequency component.

* * * * *